United States Patent [19]
Ito et al.

[11] Patent Number: 5,462,428
[45] Date of Patent: Oct. 31, 1995

[54] INJECTION MOLDING MACHINE

[75] Inventors: Susumu Ito; Kunio Kojima, both of Oshino, Japan

[73] Assignee: Fanuc Ltd., Minamitsuru, Japan

[21] Appl. No.: 157,053

[22] PCT Filed: Mar. 24, 1993

[86] PCT No.: PCT/JP93/00349

§ 371 Date: Dec. 2, 1993

§ 102(e) Date: Dec. 2, 1993

[87] PCT Pub. No.: WO93/19922

PCT Pub. Date: Oct. 14, 1993

[30] Foreign Application Priority Data

Apr. 7, 1992 [JP] Japan .................................. 4-113165

[51] Int. Cl.[6] .................................................. B29C 45/07
[52] U.S. Cl. .......................... 425/567; 425/569; 425/574
[58] Field of Search .................................. 425/567, 569, 425/574

[56] References Cited

U.S. PATENT DOCUMENTS

| | | | |
|---|---|---|---|
| 3,924,994 | 12/1975 | Aoki | 425/574 |
| 4,676,730 | 6/1987 | Yamasaki | 425/569 |
| 4,950,144 | 8/1990 | Watanabe et al. | 425/574 |
| 5,143,736 | 9/1992 | Kumamura et al. | 425/569 |
| 5,147,659 | 9/1992 | Watanabe et al. | 425/574 |
| 5,306,135 | 4/1994 | Okubo | 425/574 |

FOREIGN PATENT DOCUMENTS

| | | |
|---|---|---|
| 0328671 | 8/1989 | European Pat. Off. . |
| 0422224 | 4/1991 | European Pat. Off. . |
| 2660120 | 9/1991 | France . |
| 8516055 | 7/1986 | Germany . |
| 62-207620 | 9/1987 | Japan . |
| 1-294024 | 11/1989 | Japan . |
| 2-61894 | 12/1990 | Japan . |

*Primary Examiner*—Tim Heitbrink
*Attorney, Agent, or Firm*—Staas & Halsey

[57] ABSTRACT

An improvement in the construction of a unit carriage (5), on which an injection unit (4) is mounted in a injection molding machine, the improvement being concerned with simplifying the construction of the unit carriage (5), making easier the removal of a screw and nut (19, 20) of the nozzle touching mechanism (6), preventing the screw (19) from whirling, and making easier continuously detecting actual nozzle touching pressure. In the improved construction, a front supporting portion (11) and a rear supporting portion (12) of the unit carriage are connected by way of a connecting pipe (13); a longitudinal through passage (28) communicating with the connecting pipe is provided to a lower portion of the unit carriage (5); the screw (19) and ball bearing nut (20) of the nozzle touching mechanism (6) are arranged in this portion; the rear end of the screw (19) is supported; an indicator rod (40) is mounted on a backup plate (17) which is moved as the touching pressure is raised; and its movement is indicated in an indicator window (42).

6 Claims, 4 Drawing Sheets

INJECTION MOLDING MACHINE

TECHNICAL FIELD

The present invention relates to an improvement of a unit carriage of an injection unit and a nozzle touching mechanism in an injection molding machine.

BACKGROUND ART

In an injection molding machine, a mold clamping unit and an injection unit are arranged facing each other on a base, and the injection unit is moved back and forth for nozzle touching and release therefrom, with respect to the mold clamping unit. For this purpose, the injection unit is placed on a unit carriage which can move back and forth on the base.

The unit carriage includes a front supporting portion and a rear supporting portion, which conventionally are formed integrally with each other or connected by means of a plurality of frame members. The junction between these portions is required to have a structure capable of withstanding a compressive force or tensile force to which it is subjected during nozzle touching operation of the injection unit. Since various devices and cables are arranged intensively in this region, the junction is required to be built as simple as possible. Since the various cables are connected to the injection unit so that they can move back and forth together with the injection unit, they must be arranged lest they will not interfere with one another or run against some other members.

The injection unit is moved in the longitudinal direction by means of a nozzle touching mechanism. Usually, the nozzle touching mechanism includes a screw and a ball bearing nut, which are arranged so that the injection unit can be moved back and forth by driving the screw which is screwed in the ball bearing nut fixed to the unit carriage of the injection unit. This screw-nut portion is adequately protected by a flexible cover or the like, so that such a cover must be removed at the time of inspection or replacement.

According to the conventional arrangement and construction of the unit carriage and the nozzle touching mechanism, however, when removing the screw of the nozzle touching mechanism, the injection unit and the unit carriage have to be removed from the base. Thus, removing the screw not only requires the removal of other parts but also requires time-consuming centering and adjustment after remounting.

Furthermore, in the conventional injection unit, there is provided no means for supporting the portion of the screw which projects backward from the ball bearing nut. Thus, when the injection unit is in an advanced position where the projecting rear end portion of the screw is long, the screw tends to whirl, so that the screw and ball bearing nut may possibly suffer uneven wear.

Moreover, in the stage of adjusting of the injection molding machine, nozzle touching of the injection unit is sometimes made manually. In this case, the operator is always required to know the position of the injection unit so that he will be able to know the level of the touching pressure at least roughly even after the touching. Since the nozzle touching operation of the injection unit is controlled in accordance with the position of a dog relative to a limit switch or proximity switch, it is difficult to display the position of the injection unit continuously on a display unit by using intuitive means such as graphic forms as the display-unit is under the control of NC device. Therefore, the position of the injection unit is indicated only numerically or only by notifying the arrival of the unit at a predetermined position. Thus, it is difficult to know the relative position of the injection unit, and so still there is room for improvement for the operating procedure of the conventional injection molding machine.

DISCLOSURE OF THE INVENTION

The object of the present invention is to provide an improved injection molding machine which is provided with a unit carriage of simple construction, and in which a screw and a ball bearing nut of a nozzle touching mechanism can easily be taken out, or the screw is prevented from whirling, or an operator can easily know the position of an injection unit relative to a mold clamping unit and nozzle touching pressure.

In order to achieve the above object according to the present invention, there is provided an injection molding machine comprising a mold clamping unit and an injection unit mounted facing each other on a base, the injection unit being placed on a unit carriage capable of being moved in the longitudinal direction on the base by means of a nozzle touching mechanism; in which the unit carriage includes a front supporting portion and a rear supporting portion connected to each other by means of a longitudinally extending connecting pipe.

Preferably, the unit carriage is formed having a longitudinally penetrating through passage with the axis thereof in alignment with the axis of the connecting pipe, and is fitted with a ball bearing nut of the nozzle touching mechanism and a longitudinally disposed screw mating with the nut in a threaded manner so that the respective axes of the nut and the screw are in alignment with the axis of the through hole, a flange of the ball bearing nut being formed having a diameter smaller than that of the connecting pipe so that the screw and ball bearing nut can be drawn out from behind the unit carriage through the connecting pipe.

Further preferably, according to the present invention, the unit carriage is fitted with a bearing pipe arranged inside the connecting pipe so that the axis of the bearing pipe is in alignment with that of the connecting pipe, the rear end of the screw of the nozzle touching mechanism being inserted into the bearing pipe to be supported thereby for being movable in the longitudinal direction.

Further preferably, the rear end of the screw inserted into the bearing pipe is fitted with a bush having an outside diameter substantially equal to the inside diameter of the bearing pipe.

Further preferably, the bearing pipe is supported by bearing members arranged respectively in the front and rear portions of the connecting pipe so as to be slidable in the connecting pipe, a mounting plate connected to the rear end side of the bearing pipe being fixed to a stay integrally protruding from the rear supporting plate by bolt-nut connection, so that the screw and ball bearing nut can be drawn out from behind the unit carriage through the connecting pipe by releasing the mounting plate and the stay from the bolt-nut connection.

Further, in an injection molding machine according to the present invention, which comprises a mold clamping unit and an injection unit fading each other on a base, the injection unit is mounted on a unit carriage capable of being moved in the longitudinal direction on the base; cables for the injection unit are separated into those for communication and those for power services, housed individually in corresponding cable supporting devices, and arranged on the portion of the base under the unit carriage.

Further, in an injection molding machine according to the present invention, which comprises a mold clamping unit and an injection unit facing each other on a base, and the injection unit mounted on a unit carriage capable of being moved in the longitudinal direction on the base by means of a nozzle touching mechanism, the injection unit is provided with a spring bearing portion; a spring for nozzle touching is mounted between the bearing portion and a backup plate arranged for longitudinal movement behind the bearing portion at a certain distance therefrom; a ball nut of screw and ball bearing nut means arranged in the longitudinal direction in the nozzle touching mechanism is fixed to the backup plate and threadedly engaged with a screw penetrating the bearing portion through threads; and an indicator rod having one end fixed to the backup plate is arranged so that a pointer at the distal end thereof faces an indicator window which is attached to a unit carriage cover.

According to an aspect of the present invention, as described above, the connecting pipe is used to securely but simply connect the front and rear supporting portions of the unit carriage. Since the through passage and the screw and ball bearing nut of the nozzle touching mechanism are arranged with their respective axes in alignment with that of the connecting pipe, the screw and ball bearing nut can be drawn out backward. Furthermore, the reap end of the screw is inserted in the bearing pipe, so that the screw can be prevented from whirling.

According to another aspect of the present invention, the cable supporting devices not only protect the cables, but also prevents communication and power lines from interfering with one another or with some other members.

According to still another aspect of the present invention, an operator can visually recognize the position of the injection unit or touching pressure by watching the pointer through the indicator window.

BEST MODE OF CARRYING OUT THE INVENTION

Figure 6:
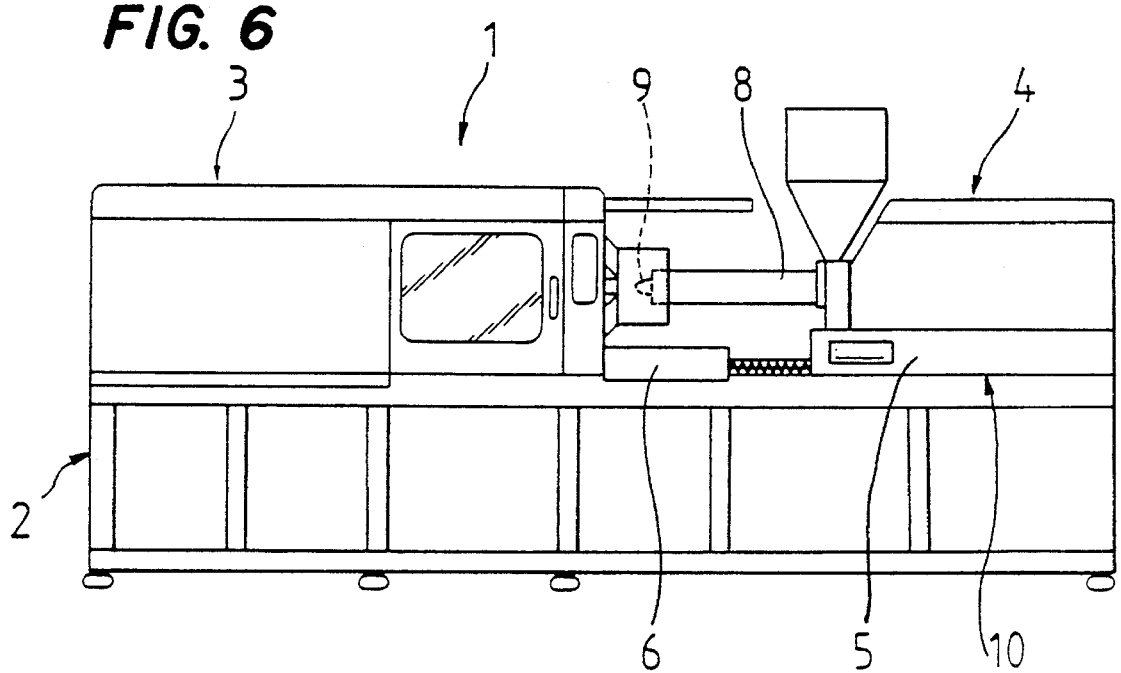
FIG. 6 is a front view schematically showing the mold clamping unit and the injection unit placed on the base of the injection molding machine of the present invention.

An injection molding machine 1 (FIG. 6) comprises a mold clamping unit 3 and an injection unit 4 mounted opposite to each other on a base 2. The injection unit 4 is placed on a unit carriage 5 (FIGS. 1 and 2), which is movable in the longitudinal direction on the top surface of the base 2, and can be moved back and forth by means of a nozzle touching mechanism 6. Numerals 7a and 7b designate two parallel rails mounted in the longitudinal direction on the top surface of the base 2. The injection unit 4 has a nozzle 9 at the distal end of its cylinder assembly 8. Nozzle touching is accomplished as the nozzle is brought into contact with a sprue of a mold attached to the mold clamping unit 3. Further, a unit carriage cover 10 is attached to outer periphery of the unit carriage 5.

The unit carriage 5 includes a front supporting portion 11 and a rear supporting portion 12, which are connected to each other by means of a connecting pipe 13. The connecting pipe 13 having a relatively large diameter is used to connect the front and rear supporting portions 11 and 12 to each other by fixing the flange rings 14a and 14b, fixed respectively on both ends of the connecting pipe 13, to the two supporting portions respectively with bolts. Both left- and right-hand sides of each of the front and rear supporting portions 11 and 12 are placed on the rails 7(a) and 7(b) of the base 2, so that the unit carriage 5, as a whole, can move in the longitudinal direction on the base 2.

The front supporting portion 11 is provided with a pivot receiving hole 15 for swiveling the injection unit 4 at the center of its top surface with respect to the crosswise direction, and a spring bearing plate 16 is mounted on the front side. The spring bearing plate 16 has a through hole at its center part. Underlying the front supporting portion 11, a backup plate 17 having a center hole is separately formed for movement in the longitudinal direction. A stay 18 (FIG. 1) protrudes downward integrally from the lower part of the rear supporting portion 12.

Figure 1:
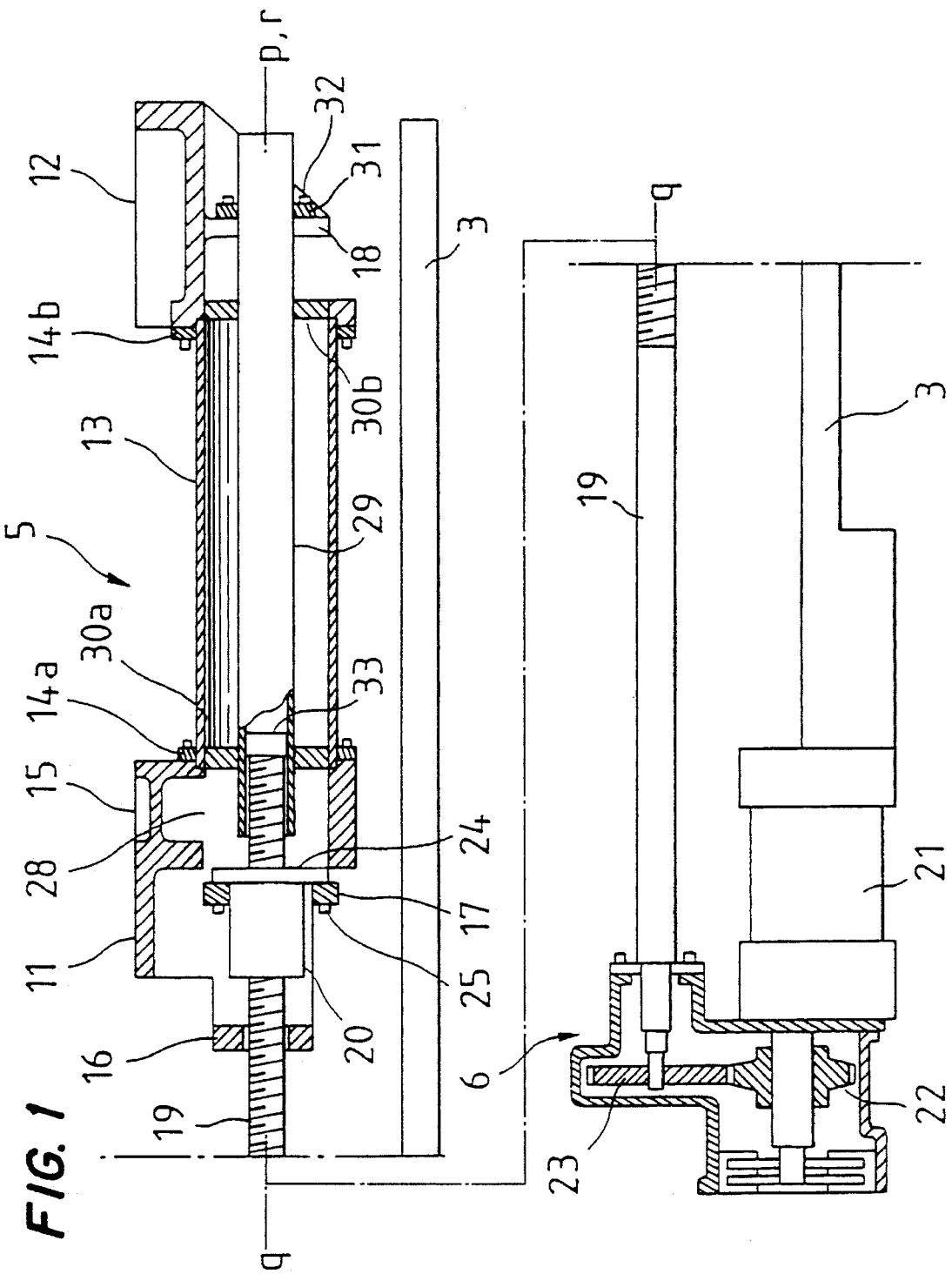
FIG. 1 is a front view, partially in section, showing a mold clamping unit and an injection unit of an injection molding machine according to the present invention.
Figure 2:
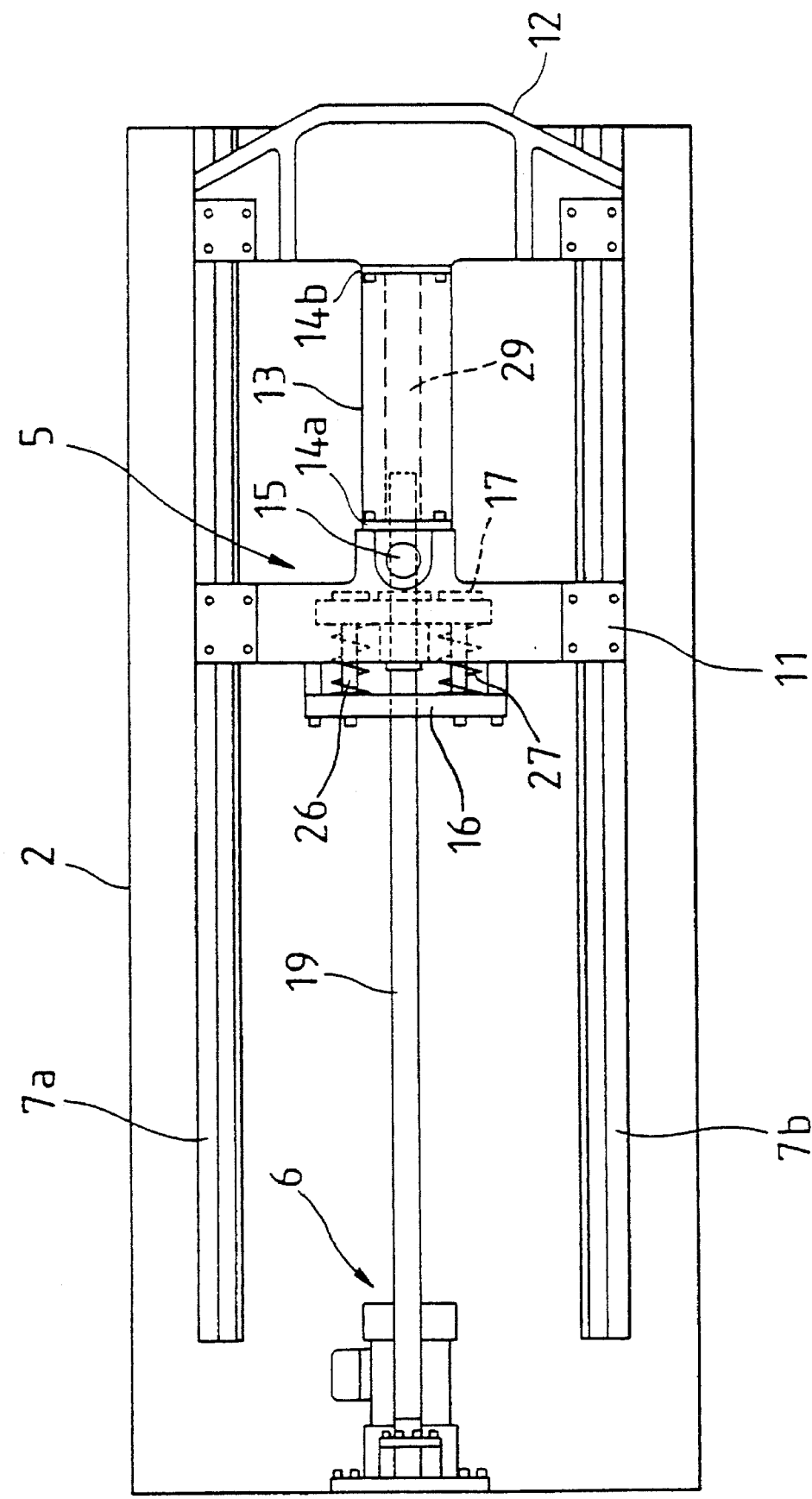
FIG. 2 is a plan view showing a base of the injection molding machine of the present invention and a unit carriage for movably carrying the injection unit on the top surface of the base.
Figure 3:
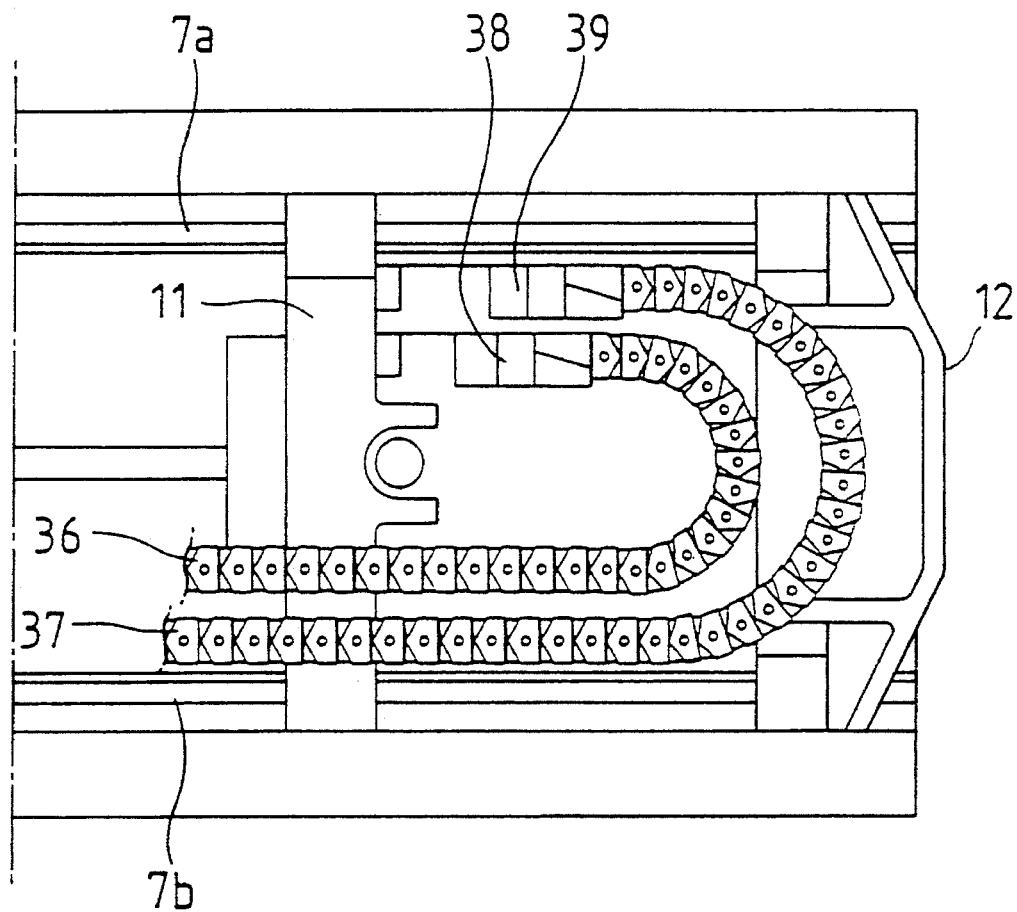
FIG. 3 is a plan view showing main part of a cable supporting devices for holding cables for communication and power services arranged on the top surface of the base of the injection molding machine of the present invention.
Figure 5:
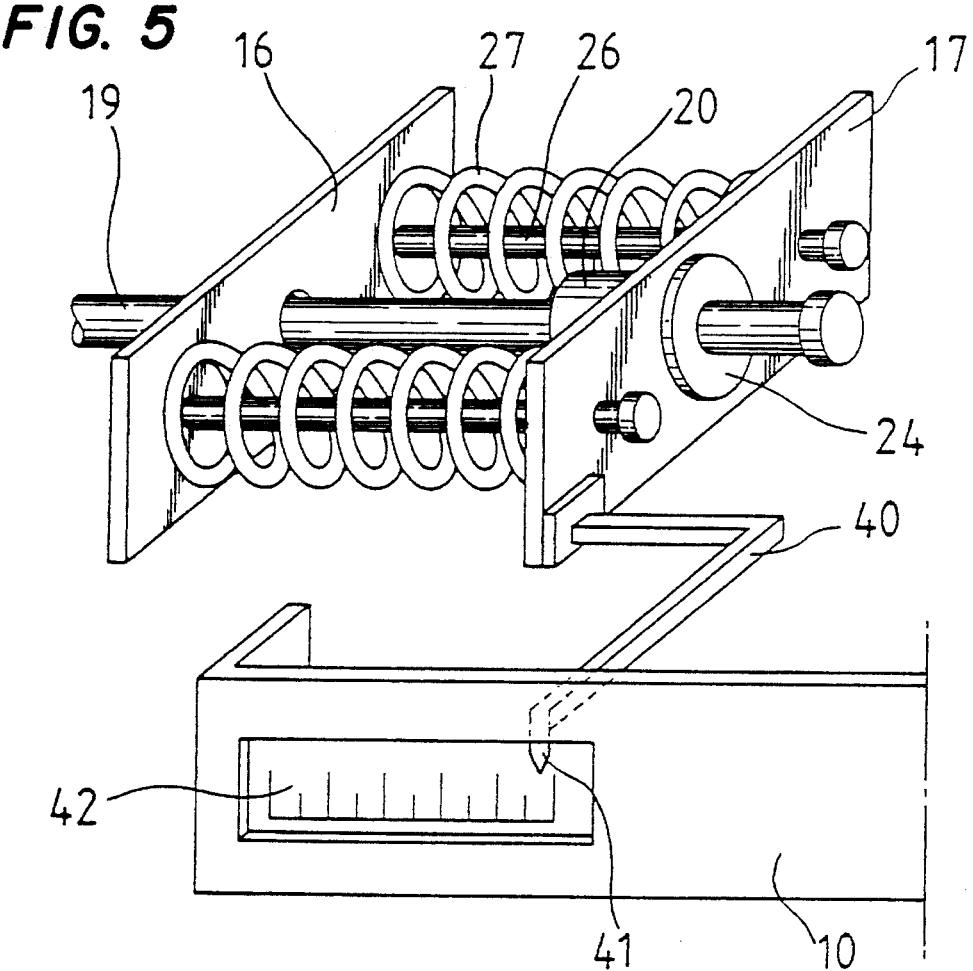
FIG. 5 is a perspective view showing main part of a nozzle touching mechanism of the injection molding machine of the present invention to which a pointer indicating the touching pressure is attached.

The nozzle touching mechanism 6 includes a screw 19 and a nut 20. The front end of the screw 19 is coupled to an output gear 23 of a reduction and braking mechanism 22, which is connected to a motor 21 for nozzle touching. On the other hand, the ball bearing nut 20 is inserted into the hole of the backup plate 17 from behind to cause a fixing flange 24 to contact the rear face of the backup plate 17, and is fixed to the front face of the backup plate 17 by means of bolts 25. The rear end of the screw 19 passes through the hole of the spring bearing plate 16, and is screwed in the ball bearing nut 20 so that its rear end portion projects backward and beyond the ball bearing nut 20 (FIG. 1). One end of each of longitudinal guide bars 26, arranged on the left and the right, is fixed to the spring bearing plate 16, and a spring 27 is mounted on each bar 26 (FIG. 5). The backup plate 17 is fitted on the guide bars 26 so that the springs 27 are compressed between the plate 17 and the spring bearing plate 16.

The respective axes p and q of the connecting pipe 13 and the ball crew 19, mounted in this manner, are in alignment with each other (FIG. 1), and a longitudinal through passage 28 is formed penetrating the front supporting portion 11, connecting pipe 13, and rear supporting portion 12. The flange 24 of the ball bearing nut 20 is designed so that its diameter is smaller than those of the through passage 28 and the connecting pipe 13. The principal parts of the screw 19 and ball bearing nut 20 are situated in the portion of the through passage 28 right under the front supporting portion 11.

A bearing pipe 29 is disposed in the connecting pipe 13 with its axis r in alignment with the axis p of the connecting pipe 13, and is mounted inside the connecting pipe 13 by means of front and rear bearing members 30(a) and 30(b). A transversely elongated mounting plate 31 is fixed to the rear end portion of the bearing pipe 29. As both ends of the plate 31 are fixed to the stay 18 from behind by means of bolts 32, the pipe 29 can be mounted on the unit carriage 5. The bearing members 30(*a*) and 30(*b*) are simply inserted into the connecting pipe 13 so that they can be moved back and forth by being pulled and pushed in the connecting pipe 13.

Further, the front portion of the bearing pipe 29 projects from the front end of the connecting pipe 13, and penetrates the lower part of the front supporting portion 11, thereby supporting the rear end portion of the screw 19. In order to make this state of support stabler, a plastic bush 33 is attached to the rear end of the screw 19. The outside diameter of the bush 33 is substantially equal to the inside diameter of the bearing pipe 29 so that there is no rattling between the bush 33 and the inner wall of the pipe although the bush is movable in the longitudinal direction.

Thus, the screw 19 and ball bearing nut 20 of the nozzle touching mechanism 6, along with the bearing pipe 29, can be drawn out behind the unit carriage 29 after going through the following steps: disconnecting the reduction and braking mechanism 22 from the screw 19, removing the bolts 25 to disconnect the backup plate 17 from the ball bearing nut 20, and further removing the bolts 32 to remove the mounting plate 31 and the unit carriage 5. In mounting the elements, in contrast with this, the screw 19 and ball bearing nut 20 are first to be attached and fixed; the bearing pipe 29, fitted with the bearing members 30(*a*) and 30(*b*), is then to be inserted into the connecting pipe 13 from behind so that its front end can be fitted on the rear end of the screw 19; and the mounting plate 31 is to be fixed to the stay 18.

Figure 4:
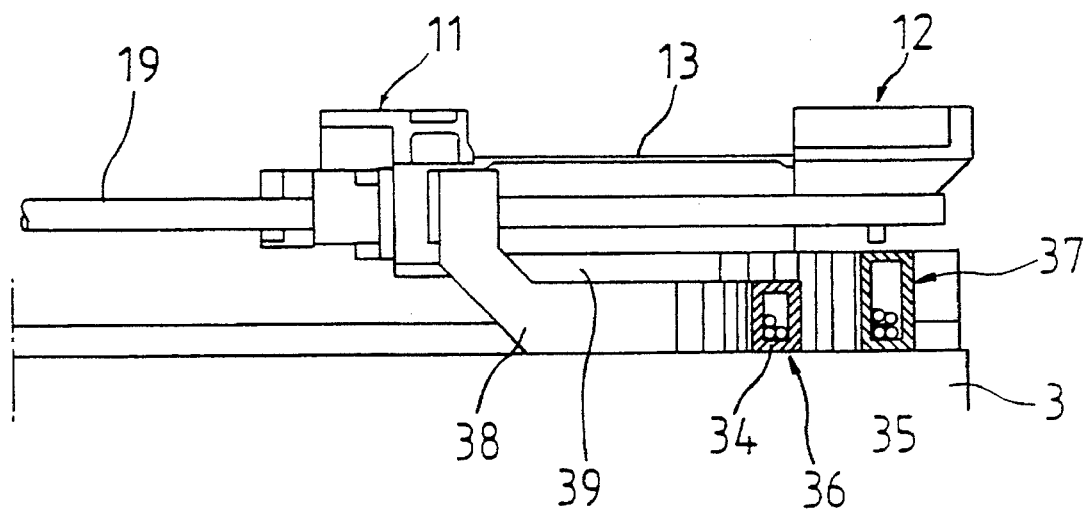
FIG. 4 is a front view, partially in section, illustrating main part of the cables for communication and power services from the base of the injection molding machine of the present invention are connected to the injection unit side.

Communication cables 34 and power cables 35 (FIG. 4) are connected to the injection unit 4 from the side of the base 2. These cables 34 and 35, which are divided into those for communication and those for power services, are housed ill cable supporting devices 36 and 37, respectively. These cable supporting devices 36 and 37 are arranged on the top surface of the base, and their respective distal end portions, directed to the injection unit 4, are fixed to the injection unit 4 by means of connecting cases 38 and 39. Thus, the cables 34 and 35 are arranged in order on the portion of the top surface of the base 2 which underlies the unit carriage 5. Since the two cable supporting devices are used, the height of each cable supporting device can be reduced, so that the devices can easily be stored under the unit carriage 5 without interference with any other members.

Further, one end of an indicator rod 40 is fixed to the backup plate 17 which is associated with the nozzle touching mechanism 6. The indicator rod 40 is a slender rigid rod having a pointer 41 on the other end, and is used to indicate the movement of the backup plate 17 by means of the pointer 41. The pointer 41 is located inside an indicator window 42, which is provided on the unit carriage cover 10 together with a scale.

When the nozzle touching mechanism 6 continues to be driven in the direction to advance the injection unit 4 after the nozzle touching operation, the springs 27 are compressed without causing the movement of the injection unit 4, thereby producing a nozzle touching pressure. In this case, the backup plate 7 also advances, and an operator can measure the level of the current touching pressure by the movement of the pointer 41, though only roughly.

The above is a description of an embodiment, and the present invention is not limited to the illustrated specific arrangement. For example, the pointer 41 may be formed of an electrical contact which moves gradually. In this case, the scale of the indicator window 42 is composed of a row of light emitting diodes (LEDs) so that the position can be indicated by causing the LEDs to glow by being in contact with the pointer. In this case, a switch for changing the type of diodes to be turned on when the backup plate 17 is moved forward for a predetermined distance after the nozzle touching operation may be additionally provided so that the color of luminous indication can be changed when the nozzle touching has occurred.

When arranged as described in the foregoing, the present invention can provide the following various effects.

The front and rear supporting portions 1 and 12 of the unit carriage 5 being coupled by means of the connecting pipe 13, the construction of the unit carriage 5 is enabled to have a simple construction. Besides, the high rigidity of the pipe structure contributes to the increase in the rigidity of the whole unit carriage 5 during the nozzle touching operation.

The screw 19 and ball bearing nut 20 of the nozzle touching mechanism 6 can be taken out without dismantling the injection unit section, so that the screw 19 and ball bearing nut 20 can easily be inspected, repaired, and replaced.

The principal parts of the screw 19 and ball bearing nut 20 are housed in the portion of the through passage right under the front supporting portion, thereby providing dustproof effect and resulting longer life to the screw 19 and ball bearing nut 20.

Since the rear end of the screw 19 is supported by the bearing pipe, the screw 19 can be prevented from whirling, thereby preventing uneven wear of the screw and nut mechanism.

The cables 34 and 35 are separated into those for communication and those for power services, arranged in order and protected by means of the cable supporting devices 36 and 37, respectively, thereby preventing the occurrence of awkward situation resulting from the troubles such that the cables functionally interfere with one another or come into contact with some other members causing mutual damage during the operation of the injection molding machine.

The operator can realize the nozzle touching pressure by the position of the pointer on the indicator window of the unit carriage cover 10.

We claim:

1. An injection molding machine comprising:

a mold clamping unit; and an injection unit facing each other on a base, wherein the injection unit is mounted on a unit carriage capable of being moved in the longitudinal direction on the base by a nozzle touching mechanism, wherein the unit carriage includes a front supporting portion and a rear supporting portion connected to each other through longitudinal ends of a connecting pipe, wherein said unit carriage includes a longitudinal through passage penetrating the longitudinal axis of said carriage unit substantially in alignment with the longitudinal axis of the connecting pipe, and wherein said carriage unit is fitted with a ball bearing nut of the nozzle touching mechanism and a longitudinal ball bearing screw mating with the nut in a threaded manner so that the respective axes of the nut and the screw are substantially in alignment with the longitudinal axis of a through hole, a flange of the ball bearing nut being formed to have a diameter smaller than that of the connecting pipe whereby the screw and ball bearing nut can be drawn out from behind the unit carriage through the connecting pipe.

2. An injection molding machine according to claim 1, wherein said unit carriage is fitted with a bearing pipe arranged inside the connecting pipe so that the longitudinal axis of the bearing pipe is substantially in alignment with the longitudinal axis of the connecting pipe, the rear end of the screw of the nozzle touching mechanism being inserted into the bearing pipe and supported therewith so as to be movable in the longitudinal direction.

3. An injection molding machine according to claim 2, wherein the rear end of said screw inserted into said bearing pipe is fitted with a bush having an outside diameter substantially equal to the inside diameter of the bearing pipe.

4. An injection molding machine according to claim 2, wherein said bearing pipe is supported by bearing members arranged individually in the front supporting portion and rear supporting portion of the connecting pipe so as to be slidable in said connecting pipe, and a mounting plate connected to the distal end of the bearing pipe is fixed to a stay integrally protruding from said rear supporting plate by a bolt-nut connection, whereby the screw and ball bearing nut can be drawn out from behind the unit carriage through the connecting pipe by releasing the mounting plate and the stay from the bolt-nut connection.

5. An injection molding machine comprising:

a mold clamping unit; and an injection unit facing each other on a base, wherein the injection unit being mounted on a unit carriage capable of being moved in the longitudinal direction on the base, wherein cables for the injection unit are separated into those for communication between the injection unit and the base and those power services, housed individually in corresponding cable support devices, and arranged on the base under the unit carriage.

6. An injection molding machine comprising a mold clamping unit and an injection unit facing each other on a base, the injection unit being placed on a unit carriage capable of being moved in the longitudinal direction on the base by a nozzle touching mechanism, wherein the injection unit is provided with:

a spring bearing portion;

a spring for nozzle touching is mounted between said spring bearing portion and a backup plate arranged for longitudinal movement behind said bearing portion at a certain distance therefrom; a ball bearing nut of a screw and a nut arranged in the longitudinal direction in the nozzle touching mechanism is fixed to said backup plate and engaged with a ball screw penetrating said spring bearing portion through threads; and an indicator rod having one end fixed to the backup plate arranged so that a pointer at the distal end of said indicator rod faces an indicator window which is attached to a unit carriage cover.

\* \* \* \* \*

UNITED STATES PATENT AND TRADEMARK OFFICE
CERTIFICATE OF CORRECTION

PATENT NO. : 5,462,428
DATED : October 31, 1995
INVENTOR(S) : Ito et al.

It is certified that error appears in the above-indentified patent and that said Letters Patent is hereby corrected as shown below:

Col. 4, line 64, after "axis" (first occurrence) change "r" to --r--, after "axis" (second occurrence), change "p" to --p--.

Signed and Sealed this

Ninth Day of January, 1996

Attest:

BRUCE LEHMAN

Attesting Officer

Commissioner of Patents and Trademarks